United States Patent Office 2,710,039
Patented June 7, 1955

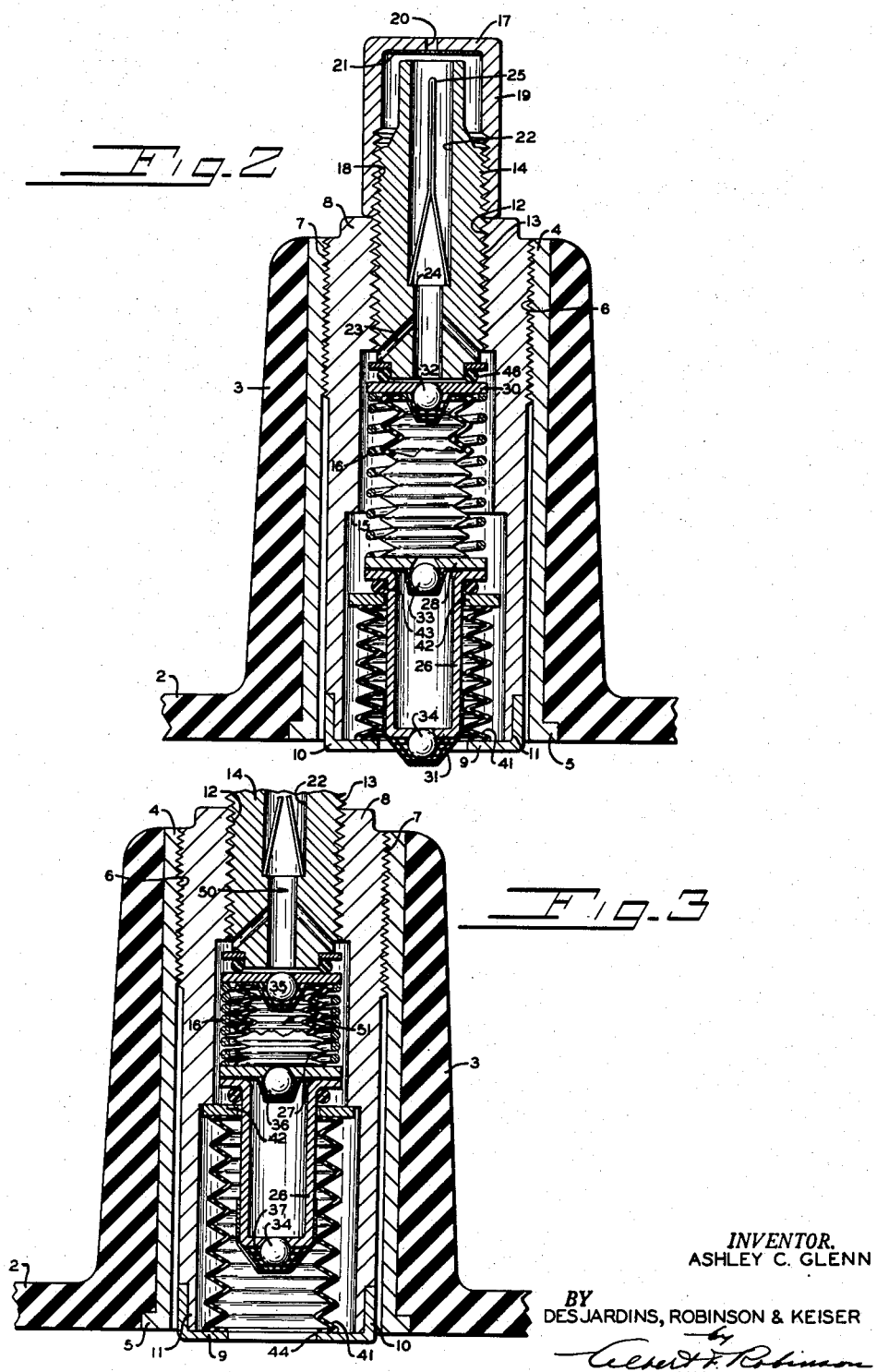

2,710,039

TIRE PRESSURE REGULATOR VALVE

Ashley C. Glenn, Covington, Ky.

Application December 9, 1952, Serial No. 324,909

17 Claims. (Cl. 152—418)

This invention relates to a tire pressure regulator valve, and more particularly to a tire valve unit which is of a construction to maintain a predetermined air pressure within the tire, and to vent any excess air pressure above the predetermined amount.

Tire valves, as heretofore constructed, do not regulate the tire pressure, and a tire gauge, usually connected with the air supply, is used to prevent the tire from being overinflated. Or a hand gauge may be used to check the air pressure in the tire, the tire being manually vented to relieve any excess pressure until the desired pressure is obtained. The tire valve mechanism itself is not of a construction to regulate the prescribed air pressure in the tire from the air supply, or even to maintain the prescribed air pressure that is placed therein. Consequently, the air pressure in the tires must be constantly checked for overinflation and underinflation even after they have been inflated to the prescribed pressure since it is common knowledge that continued fast driving, more particularly in hot weather, causes the air pressure within the tire to be increased by several pounds. Therefore, for long drives, the common practice is to underinflate the tires and allow for expected increased air pressure resulting from the driving. This is, of course, a makeshift arrangement at best inasmuch as driving conditions change constantly with the obvious result that more often the proper tire pressure is never maintained and, at best, in only wide ranges.

Accordingly, one of the main objects of the invention is a tire valve unit which automatically regulates the tire pressure.

Another object of the invention is a tire valve unit which is adjustable for any prescribed pressure.

Another object of the invention is a tire valve unit which automatically regulates and maintains the prescribed tire pressure at all times and under all driving conditions.

Still another object of the invention is a tire valve unit which is simple in construction and efficient in operation.

A still further object of the invention is a tire valve unit which can be readily substituted for conventional valve units without any modification being made in the tire or the tube construction.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims. A structure constitutes a preferred embodiment of my invention is illustrated in the accompanying drawings, forming a part of this specification, in which:

Fig. 2 is a similar cross-sectional view showing the relative position of the parts of the valve unit when the tire is underinflated.

Fig. 3 is a similar cross-sectional view showing the relative position of the parts of the valve unit when the tire is overinflated and said valve unit is in air venting position.

Figure 1:
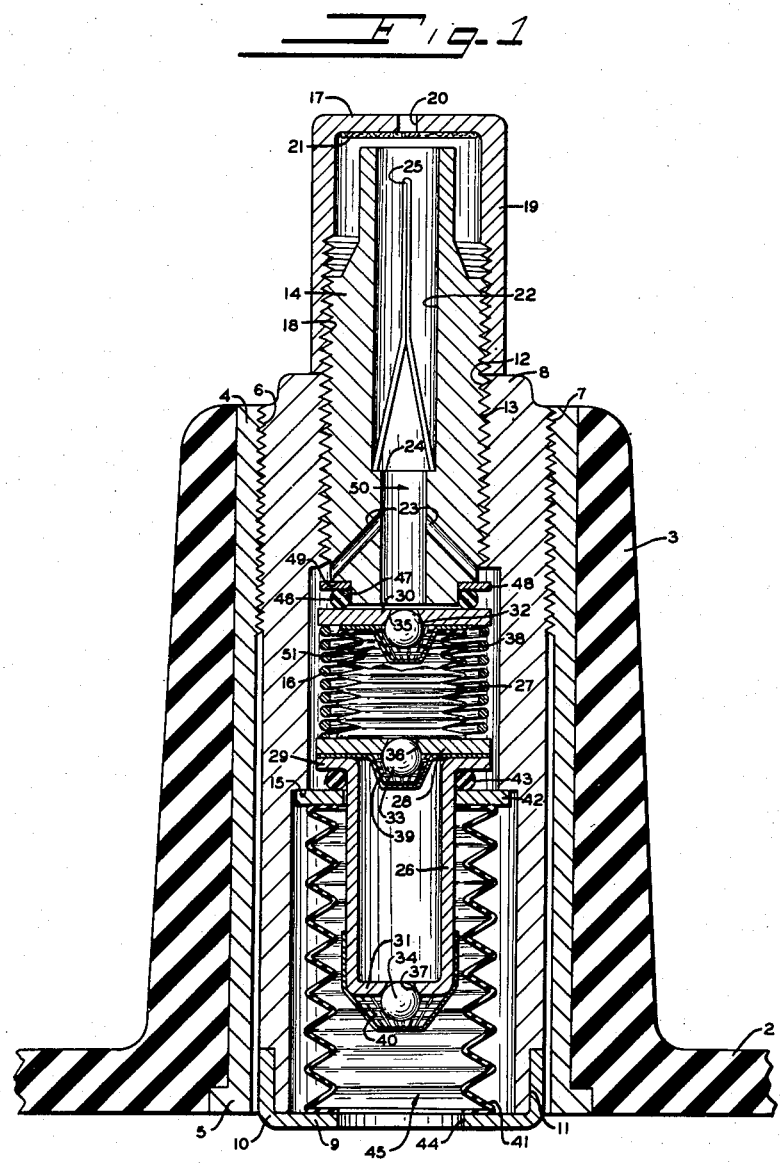
Fig. 1 is a cross-sectional view of one embodiment of the invention showing the normal relative position of the parts of the valve unit when the valve is inflated at the prescribed pressure.

The invention generally described comprises an axially movable member having a plurality of chambers arranged in tandem and provided with check valves to permit the tire to be inflated through the valve unit from conventional air hoses attached to an air supply. When the tire is inflated to the prescribed air pressure, the axially movable member is moved to a certain position by the tire pressure, and any further movement thereof opens a vent to release excess pressure and permit said vent to close for retaining the prescribed pressure in the tire. On the other hand when the tire is underinflated, the axially movable member is moved in the opposite direction by opposing or resisting spring pressure and allows one of the chambers, whose wall is longitudinally compressible and expansible, to be alternately compressed and expanded by varying air pressures within the tire caused by irregularities in the road during driving, thereby pumping air from the surrounding atmosphere to another chamber connected thereto to build up sufficient pressure therein in excess of the tire pressure to be injected into the tire until the prescribed pressure is obtained, after which any additional pressure is vented to prevent overinflation.

Referring specifically to the drawings in which like numerals are used to designate like parts, numeral 2 is a conventional inner rubber tube for a tire having a cylindrical tubular wall 3 for reception of the valve unit or a tubular sleeve 4 to which the valve unit is fitted. This tubular sleeve is preferably provided with an outwardly extending flanged end 5 and is vulcanized or otherwise fitted into the opening of the cylindrical tubular wall 3 of the tube to prevent the seeping of air between the sleeve and the tire. The end of the tubular sleeve 4, opposite the flanged end, is provided with screw threads 6 for mating with corresponding screw threads 7 on the end of the hollow housing 8 of the valve unit, said housing being substantially of the same length as the tubular sleeve in which it is mounted.

The other end of the housing 8 has an inwardly turned flange 9, this being preferably formed on a cap member 10 having a cylindrical wall fitting an annular groove 11 formed in the outer wall at the inner end of the housing. The opposite end of the housing is interiorly threaded at 12 to mate with screw threads 13 on the outer wall of an adjustable plug 14. The interior wall of the housing is provided with a shoulder or step 15, preferably disposed about medially between its opposite ends.

The plug 14 is adjustable within the housing for tensioning the spring 16 hereinafter described and is locked in adjusted position by a cap 17, which is screw threaded at 18 on its wall portion 19, its open end abutting against the end of the housing to lock said plug in adjusted position. The cap is perforated at 20 to permit air being drawn therein, and an air screen or filter cloth 21 may be interposed between the cap and the end of the plug. The plug has a central axial bore 22 therethrough from one end and terminates in diverging ducts 23. These ducts are of such size as is necessary to restrict flow of air therethrough in that if there should be any opening of the vent due to temporary or momentary overinflation, the flow of air from the tube will be sufficiently slow to prevent excess deflation at a time when tire pressure is normal or underinflated. Its inner wall is stepped or shouldered at 24 for seating one end of a pin 25 whose opposite end is disposed in position to unseat the valve of an air supply hose.

A plurality of axially displaceable chambers are mounted in the housing in tandem relation, one of these chambers being formed by a longitudinally compressible and expansible accordion-like member 27, these members being connected end to end by a plate 28 fixed on the flanged end 29 of the cup-shaped member. A plate 30, similar to plate 28, is fitted to the opposite end of the accordion-like member 27. Each of the plates 28 and 30, as well as the bottom end 31 of the cup-shaped member 26, is provided with the respective check valves 32, 33 and 34 held adjacent to their respective seats 35, 36 and 37 by respective cages 38, 39 and 40. Cages 38 and 39 are each fixed to one of the plates, and the cage 40 is fixed to the end of the cup-shaped member that is opposite the flanged end.

Surrounding the cup-shaped member 26 is another compressible and expansible bellows-like member 41 having one end fixed to the flange 9 of cap 10 and its opposite end fixed to plate 42. Interposed between this plate 42 and the outwardly turned flanged end 29 is a sealing ring or gasket 43 of any suitable material, such as rubber. There is an opening 44 through the cap member 10 for communication of the interior of the tire with the chamber 45 that is between the cup-shaped member 26 and the bellows-like member 41 for permitting the air pressure in the tire acting against the plate 42 and the end of the cup-shaped member to urge said plate toward the shoulder or step 15 on the housing and at the same time moving the cup-shaped member 26 to compress the spring and the bellows-like member 27 until the plate is seated against said shoulder or step 15. Further movement of the cup-shaped member against the spring, after the plate is seated on the shoulder or step, will open the normally sealed relation around the sealing ring or gasket 43 to vent air therethrough and permit it to escape through the opening in the adjusting plug in the manner of a slow leak. The cup-shaped member and the member 41 are articulated and non-fixed so that one can move relative to the other in the venting operation.

Another sealing ring 46 is interposed between the plate 30 and the end of the adjusting plug, which is preferably reduced in diameter by an annular groove 47 for seating said ring 46 or the seating plate or washer 48. This seating washer 48 may be of sufficient diameter to overhang the shoulder or step 49 on the interior wall of the housing for seating thereagainst to close the venting passage, through the plug, should it be desired to do so. However, the valve unit is preferably constructed so that the seating washer will always be spaced from the shoulder in order that the venting passage will be open at all times. The adjacent faces of the shoulder and the seating washer may, if desired, be of non-mating conformation so that the vent passage will always remain open even when the seating ring is seated upon the shoulder.

The variation or fluctuation of pressure within the tube, resulting from the irregularities in the pavement, causes air to be drawn into the valve unit through the perforated lock cap into the chamber 50, through the first check valve, and transmitted into the pumping chamber 51, through the second check valve, where it is compressed in said pumping chamber 51 until sufficient pressure is built up therein in excess of the tire pressure to be injected through the third check valve into the tire. This air pumping action of the valve unit is continuous so that the prescribed air pressure is built up and maintained to seat the plate on the shoulder or step 15 of the housing, after which any further air pressure in the tire will be vented by unseating the sealing ring between the articulated members.

Construction and operation of the valve unit will be obvious from the foregoing description, Fig. 1 showing the normal relative position of the parts of the valve unit when the tire is inflated to the prescribed air pressure, this being determined by the tensioning of the spring by means of the adjusting plug. Should the tire become underinflated, as shown in Fig. 2, the air pumped therein by the irregular variation or fluctuation of the air pressure within the tire, operates the chamber members to build up the predetermined air pressure and with the plate 42 seated on the shoulder or step 15 of the housing member and compressing the spring. Continued pressure into the tire will unseat the sealing ring between the articulated parts and vent the tire until the ring is reseated in sealed relation between the articulated members.

It will be understood that there are two main features of the invention, one being the automatic venting of the valve unit and the other being the pumping action. The venting structure could be used independently of the pumping feature and would alone be highly desirable to prevent overinflation without the use of a separate gauge means.

I am aware that there may be various changes in details of construction without departing from the spirit of my invention, and, therefore, I claim my invention broadly as indicated by the appended claims.

Having thus described my invention, what I claim as new and useful and desire to secure by U. S. Letters Patent is:

1. A tire valve unit comprising a housing adapted to be fitted to the tire, an axially movable chambered member mounted in the housing having a check valve, through which the air is adapted to be supplied to the tire, means movable with said chambered member, and movable relative thereto, which is adapted to be actuated by the air pressure in the tire against a seat formed on the housing, a pumping chamber associated with the axially movable chambered member for pumping air therein, said pumping chamber being provided with a check valve normally closed by the tire pressure, and means for holding the chambered member and the means movable therewith in normally sealed relation when the tire pressure is at and below a predetermined amount but permits them to be unsealed to vent excess air pressure from the tire.

2. The tire valve unit of claim 1 in which the holding means in a spring.

3. The tire valve of claim 2 having an adjustable plug for regulating the resistance of the spring.

4. A tire valve unit comprising a housing adapted to be fitted to a tire, an axially movable member comprising a plurality of chambers arranged in tandem with a check valve disposed at the opposite ends of each of the chambers, one of the chambers being longitudinally compressible and expansible for being actuated to pump air through said chambers from the outside atmosphere into the tire, a member movable with an axially movable member forming a chamber in communication with the interior of the tire and adapted to be actuated by the air pressure in the tire against a seat formed on the housing, and means for holding the axially movable member and the member movable therewith in sealed relation when the tire pressure is inflated to a predetermined amount or is underinflated but allows their sealed relation to be broken for venting the tire pressure when overinflated.

5. The tire valve unit of claim 4 in which the holding means is a spring.

6. The tire valve unit of claim 5 in which an adjustable plug is provided for adjusting the resistance of the spring.

7. The tire valve unit of claim 6 in which a closing cap is provided for locking the plug in adjusted position.

8. The tire valve unit of claim 7 in which the plug and closure cap are each perforated for communicating the chambers with the surrounding atmosphere.

9. A tire valve unit comprising a housing for fitting said unit to a tire, an axially movable member comprising a plurality of chambers disposed in tandem relation and having a check-valve between them and at each of the opposite ends of said chambers, one of said chambers having a longitudinally compressible and expansible wall, a longitudinally compressible and expansible wall surrounding one end of the axially movable member having one end supported on the housing and its opposite end non-fixedly jointed to the said axially movable member, said surrounding wall enclosing a pressure chamber communicating with the air chamber of the tire for actuating said axially movable member in response to the tire pressure, a compression spring oppositely disposed to resist movement of said axially movable member by the tire pressure, means for air-sealing the non-fixed joint connection between the axially movable member and the end of the compressible and expansible wall, and means disposed on the housing for breaking the air-sealing joint connection when the tire pressure has compressed the spring beyond a predetermined point.

10. The tire valve unit of claim 9 comprising an adjustable plug mounted in the housing for adjusting the resistance of the spring.

11. The tire valve unit of claim 10 comprising a closure clamp for locking the adjustable plug in adjusted position.

12. The tire valve unit of claim 11 in which the adjusting plug and the clamping cap are provided with a recess to provide a communicating duct from the surrounding atmosphere to the chambers of the axially movable member.

13. A tire valve unit comprising a housing adapted to be fitted to a tire, axially movable chambered means mounted in the housing having one side responsive to the tire pressure, a check valve mounted on the opposite ends of said chambered means adapted to be held normally closed by the tire pressure, an air pumping chamber disposed adjacent one end of the axially movable chambered means carrying a check valve, also held normally closed by the tire pressure, a compression spring mounted in the housing at the opposite side of the axially movable member to resist its axial movement resulting from the air pressure, and means, carried by the axially movable chamber means, for venting the tire pressure when the spring has been compressed to a predetermined point by the tire pressure.

14. The tire valve unit of claim 13 having means for varying the spring resistance to the tire pressure.

15. The tire valve unit of claim 14 in which the axially movable means is provided with a pumping means adapted to be actuated by the variation or fluctuation of air pressure within the tire for supplying air thereto.

16. The tire valve unit of claim 15 in which the pumping means is a longitudinally expansible chamber having a check valve at its opposite end.

17. The tire valve unit of claim 16 in which a second chamber is disposed between the pumping chamber and the tire and there is a check valve at the end of the second chamber.

References Cited in the file of this patent

UNITED STATES PATENTS

| | | |
|---|---|---|
| 1,179,549 | Molkenbur | Apr. 18, 1916 |
| 1,303,893 | Haskins | May 20, 1919 |
| 1,330,560 | Tenney | Feb. 10, 1920 |
| 1,647,401 | Evans | Nov. 1, 1927 |
| 1,875,874 | Johnson | Sept. 5, 1932 |
| 2,593,423 | Eastman | Apr. 22, 1952 |

FOREIGN PATENTS

| | | |
|---|---|---|
| 538,813 | France | of 1922 |